3,657,416
THROMBIN-LIKE DEFIBRINATING ENZYME FROM THE VENOM *ANCISTRODON RHODOSTOMA*
Hugh Alistair Reid, Liverpool, and Michael Peter Esnouf, Oxford, England, and Kok Ewe Chan, Kuala Lumpur, Malaya, assignors to National Research Development Corporation, London, England
No Drawing. Continuation-in-part of applications Ser. No. 350,644, Mar. 10, 1964, and Ser. No. 433,215, Feb. 16, 1965. This application July 25, 1967, Ser. No. 655,781
Claims priority, application Great Britain, Feb. 21, 1964, 7,264/64
Int. Cl. A61k *17/08, 19/00;* C07g *7/026*
U.S. Cl. 424—94
5 Claims

ABSTRACT OF THE DISCLOSURE

*Ancistrodon rhodostoma* venom may be purified by removal of proteolytic enzymes which cause tissue and vascular necrosis to produce a purified fraction having thrombin-like defibrinating activity associated with an enzyme which may be isolated in highly pure form. The preparation of pharmaceutically acceptable venom fractions by chromatography on weakly basic anion exchange materials and their use in the treatment of mammalian blood is described. The purified enzyme is characterised by physical, chemical, and biological properties.

---

This invention is concerned with substances having activity in relation to the clotting of mammalian blood, and is a continuation-in-part of our application Ser. No. 433,215 filed Feb. 16, 1965, and our application Ser. No. 350,644 filed Mar. 10, 1964, both now abandoned.

The clotting of human and other mammalian blood proceeds by a complicated mechanism which occurs in distinct stages. In the last stage of the process, blood fibrinogen is converted by means of the enzyme thrombin into "fibrin monomer" which then undergoes polymerisation to produce fibrin, the material of the clot. It has now been discovered that there exists in the venom of *Ancistrodon rhodostoma* (Boie) (the Malayan pit viper) an enzyme which has a thrombin-like action but which modifies blood fibrinogen in such a way that the fibrin produced from it has different properties from those of the normal thrombin-formed clot. Fibrin induced by this enzyme is of a wispy character and as a result of the continual flow of blood in vivo it is insensibly dispersed in the blood passages so that clot formation does not occur. It has been found that A. rhodostoma venom may be purified by removal of proteolytic constituents which cause severe local reaction and other undesirable side effects to produce a purified concentrate in which the properties of the defibrinating anticoagulant enzyme may be utilised by injection of purified material into the blood stream. It has moreover been established that the active principle may be isolated from the venom in highly pure form as hereinafter described.

The purified active substance of this invention is characterised by the following physicochemical and biological properties as determined on material containing not more than 1 or 2% protein impurity.

(1) It is proteinaceous and substantially colourless when pure (2) It contains carbohydrate (3) It is absorbed by weakly basic anion exchange material such as diethylaminoethyl cellulose and triethylaminoethyl cellulose (4) It is soluble in physiological saline (5) It has an electrophoretic mobility [1] of $3.9 \times 10^{-5}$ volts/cm./sec. in 0.1 M phosphate buffer pH 7.0

(6) It has a diffusion coefficient $D_{20}$ of $4.8 \times 10^{-7}$ sq. cm./sec. at a concentration of 4.86 mg./ml.

(7) In polydisperse form the observed molecular weight is of the order of 40,000 as determined in the ultracentrifuge, the inferred molecular weight being of the order of 30,000

(8) It has a sedimentation co-efficient $S_{20}W = 3.4$ svedbergs at a concentration of 4.86 mg./ml.

(9) It has a partial specific volume of approximately 0.7 at a concentration of 4.86 mg./ml.

(10) Its biological activity is thrombin-like and anticoagulant in vivo

(11) It is not significantly inhibited by $1 \times 10^{-3}$ molar di-isopropylfluorophosphate within 5 minutes.

The active substance exerts its defibrinating effect rapidly after administration and persists in the body for long periods e.g. up to two weeks in contrast to the heparin group of anticoagulants. On the other hand its action may be rapidly reversed by means of specific antivenin. It is non-toxic, highly active at very low concentrations, and gives rise to no spontaneous hemorrhagic complications.

It is highly specific in its action and appears to have no effect on other factors of the blood clotting mechanism than fibrinogen. As a result of this combination of properties it is valuable in the treatment of thrombosis, especially during the period in which the probability of a second and perhaps fatal attack is high. The pure substance is stable for very long periods at —20° C.

In accordance with the invention, a pharmaceutical preparation for the treatment of mammalian blood by parenteral administration is obtained by adsorbing *A. rhodostoma* venom on weakly basic anion exchange material suitable for absorption of protein i.e. of sufficiently weak basicity to avoid denaturation of protein, and recovering from the material a fraction containing the thrombin-like defibrinating activity substantially free of proteolytic enzyme which cause vascular and tissue necrosis. Suitable weakly basic anion exchange materials are certain polysaccharide materials containing tertiary amino (dialkylaminoalkyl) groups and in practice DEAE-cellulose and TEAE-cellulose are highly convenient materials to use for the purpose of this invention, the latter being especially preferred on account of the greater ease with which it enables the active material to be separated from amino acid oxydase. The basic strength of the material, which is determined by the degree of substitution with the aminoethyl groups, is an important factor in preserving the stability of the active protein and should not be too high. The basicity of the material, usually expressed as milli-equivalents per gram, will in part determine the molarities of the eluting buffers employed in the separation, and optimum combinations will readily be settled by experiment. DEAE-Sephadex (trademark) and similar materials have different basicities from DEAE-cellulose and will require the choice of appropriate buffer systems and concentrations.

The active material is recovered by elution of the anion exchange column and with DEAE- and TEAE-cellulose columns step-wise elution with buffers of increasing molarity, e.g., tris/phosphate buffer has given excellent results. Tris is an abbreviation of tris (hydroxymethyl) aminomethane. For example, with TEAE-cellulose of capacity 0.7 milliequivalent/gram the undesirable constituents of the venom are eluted with tris/phosphate buffer at pH 6.0 in concentrations increasing stepwise up to about 0.04 M after which the active material may be eluted with the

---

[1] This figure is quoted in preference to the value of between 5.5 and 6.0 as determined in barbiturate buffer at pH 8.6.

same buffer at concentrations from 0.09 M to 0.1 M or slightly higher. The solution of active material leaving the column may, if desired, be freeze-dried to produce a light powder which may be stored in ampoules at low temperature either in bulk or in unit doses. Alternatively the solution may be made isotonic with normal physiological saline by the adjustment of its electrolytes with tris/phosphate or other buffer after which it may be sterilised e.g. by filtration to produce a composition usable directly for parenteral administration. This solution or one obtained by reconstitution of the freeze-dried powder may be given either intravenously or intramuscularly at a dosage of, for example 0.2–10 preferably 0.2–2 micrograms of active substance per kilo. In the dog, dosages even as high as 1500 micrograms per kilo are tolerated without adverse effect and the blood is rendered incoagulable for long periods.

The invention is described in more detail in the following examples:

EXAMPLE 1

Triethylaminoethyl cellulose powder (Serva) of capacity 0.71 m.equiv./gm. is suspended in 2 M sodium chloride buffered with 0.1 M tris/phosphate pH 6.0 and the slurry is packed into a glass column 3.6 cm. in diameter until the height of the packed material reaches 20 cm. The column is washed with a further 2L of the solvent used for preparing the slurry and is then equilibrated with 0.01 M tris/phosphate buffer pH 8.5. Tris is an abbreviation for tris(hydroxymethyl) aminomethane.

330–360 mg. of crude *A. rhodostoma* venom is dissolved in 20 ml. of 0.01 M tris/phosphate buffer pH 8.5, centrifuged to remove insoluble material, and the clear supernatant is applied to the column. The fractionation is carried out at room temperature at a flow rate of 90–100 ml./hour. The protein concentration in the eluate is estimated from the extinction of the solution at 280 m$\mu$ in 1 cm. cells.

The chromatogram is developed with the following buffers. In all cases the molarity of the buffers are with respect to tris.

0.01 M tris/phosphate pH 8.5 (to wash venom onto the column) (fractions 1, 2, 3.)
0.01 M tris/phosphate pH 7.0 (fraction 4)
0.02 M tris/phosphate pH 6.0
0.04 M tris/phosphate pH 6.0 (fraction 5)
0.10 M tris/phosphate pH 6.0 (fraction 6)
0.10 M tris/phosphate+0.10 M NaCl pH 6.0 (fraction 7)

The changes in eluting buffer are made after the column has equilibrated with the buffer. The protein fractions obtained in this way are assayed for coagulant activity.

Less than 1% of the applied coagulant activity is recovered in fraction Nos. 1, 2, 3, 4. Fraction 1 however possesses proteolytic activtity which in concentrated solutions would dissolve fibrin clots. The appearance of the coagulant activity is summarised in the following table.

| Fraction number | Units/ml. | $E_{280}$ | Specific activity |
|---|---|---|---|
| Crude venom | 100 | 0.174 | 574 |
| 5 | 9 | 0.085 | 106 |
| 6 | 78 | 0.0125 | 6,240 |
| 7 | 35 | 0.0540 | 648 |

Units,—These are arbitrary units, 100 units referring to the clotting time of the starting venom diluted (1/100),
$E_{280}$ = Extinction of fraction at the dilution used for assay of the thrombin-like activity, The recovery of the thrombin-like material ranges between 50–65% in fraction 6, the remaining material appearing in fractions 5 and 7.

The thrombin-like activity is eluted from these columns in significant amounts at a buffer strength of 0.04 M or greater.

The eluate is freeze dried to give a light powdery product. Yield: 18–20 mg. per 350 mg. dry venom.

EXAMPLE 2

The procedure described in Example 1 takes about 36 hours to complete. A modification of the fractionation procedure, taking 14 hours, is as follows:

The length of the column is reduced to 15 cm. and equilibrated with 0.01 M tris/phosphate pH 6.0. The crude venom (350 mg.) is dissolved in 20 ml. 0.01 M tris/phosphate pH 6.0 and after centrifuging is applied to the column. The column is eluted with this buffer until no further protein is eluted, and then with the following:

0.02 M tris/phosphate pH 6.0
0.035 M tris/phosphate pH 6.0
0.09 M tris/phosphate pH 6.0

The purity of the material obtained with the last solvent is as good as obtained in Example 1, and, in some cases, the yield is increased to nearly 70%.

As in Example 1, the product may be recovered in freeze-dried form or the final solution may be adjusted to physiological pH and made isotonic by the addition of tris/phosphate and then sterilised by filtration.

Method of assay of thrombin like activity 0.1 ml. oxalated bovine plasma is incubated at 37° with 0.1 ml. 0.15 M sodium chloride buffered with 0.01 M tri-hydroxymethyl-amino-methane (tris)/Cl$^-$ pH 7.5. To this is added 0.1 ml. 0.025 M CaCl$_2$ followed by 0.1 ml. of a fraction of the venom, and the clotting time of the mixture recorded. The clotting times obtained for a range of venom concentrations is plotted on log-log co-ordinates and a straight line is obtained.

In operating the process of extraction of the active material by chromatography on DEAE- or TEAE-cellulose, the pH, molarity, and other conditions are interrelated and best determined by experiment. As a guide, however, it may be stated that after elution of the proteolytic fraction the desired material may be eluted with tris/phosphate buffer in the pH range 5.5–7.5 and molarity of 0.04 M upwards, the total molarity of the solution being adjusted to at least 0.08, where necessary, with sodium chloride or other suitable salt.

Amino acid analysis of the purified enzyme after hydrolysis with 6 N HCl at 108° C. for periods of 16, 42, 70 and 113 hours gives results shown in the table.

TABLE

| Amino acid: | Residues per $10^5$ g. |
|---|---|
| Aspartic acid | 99.1 |
| Threonine | 22.6 |
| Serine | 28.3 |
| Glutamic acid | 46.8 |
| Proline | 41.3 |
| Glycine | 52.9 |
| Alanine | 35.4 |
| Valine | 25.5 |
| ½ cystine | 43.2 |
| Methionine | 16.6 |
| Iso-leucine | 55.6 |
| Leucine | 45.4 |
| Tyrosine | 18.5 |
| Phenylalanine | 20.8 |
| Histidine | 21.5 |
| Lysine | 33.5 |
| Arginine | 59.5 |
| Tryptophan | ([1]) |

[1] Not measured.

The figures for those amino acids which are partially destroyed during hydrolysis have been obtained by extrapolation to zero time. The value given for those amino acids which are released slowly is the maximum value obtained. The recovery of the amino acids nitrogen and ammonia accounted for 98 percent of the applied nitrogen: however, when the recoveries were calculated on a weight basis, it was found that weight of the anhydro-amino acids and nitrogen accounted for about 70 percent of the weight of the material. A considerable amount of this discrepancy can be accounted for by carbohydrate, since it was found that the fraction contained at least 20 percent carbohydrate as judged by the procedure of Dubois et al. (Analytical Chemist 28, 350, 1956).

Calculation of the molecular weight of the protein based on the amino acid composition gives a value of 30,000 which is in very good agreement with that obtained by physical methods.

We claim:

1. A thrombin-like defibrinating enzyme substantially free from haemorrhagic components, amino acid oxydase and constituents which cause tissue and vascular necrosis, derived from the venom *Ancistrodon rhodostoma*, having the following properties:
   (a) it is proteinaceous and substantially colourless when pure
   (b) it contains at least 20%, carbohydrate
   (c) it has a light powdery texture when in the freeze-dried state
   (d) it is adsorbable on weakly basic anion exchange materials
   (e) it is soluble in physiological saline
   (f) it has an electrophoretic mobility of $3.9 \times 10^{-5}$ volts/cm./sec. in 0.1 M phosphate buffer pH 7.0
   (g) it has a diffusion coefficient $D_{20}$ of $4.8 \times 10^{-7}$ sq. cm./sec. at a concentration of 4.86 mg./ml.
   (h) in polydisperse form the observed molecular weight is of the order of 40,000 as determined in the ultracentrifuge, the inferred monomeric molecular weight being of the order of 30,000.
   (i) it has a sedimentation coefficient $S_{20}W = 3.4$ svedbergs at a concentration of 4.86 mg./ml.
   (j) it has a partial specific volume of approximately 0.7 at a concentration of 4.86 mg./ml.
   (k) it is not significantly inhibited by $1 \times 10^{-3}$ molar di-isopropyl fluoro phosphate within 5 minutes, and
   (l) it has activity which converts fibrinogen to fibrin and which, upon in vivo administration, renders blood incoagulable.

2. A pharmaceutical preparation useful for rendering blood incoagulable in vivo, which comprises an effective amount to render blood incoagulable of the enzyme of claim 1 in combination with a physiologically acceptable non-toxic inert carrier.

3. A process for the production of the enzyme of claim 1, which comprises adsorbing the *Ancistrodon rhodostoma* venom on diethylaminoethyl cellulose or triethylaminoethyl cellulose, eluting proteolytic and other unwanted constituents with tris/phosphate buffer at pH 6.0 at concentrations of up to 0.04 M, eluting the enzyme fraction with tris/phosphate buffer at pH 6.0 at concentrations of from 0.09 M to 1.0 M and recovering the enzyme fraction.

4. A method of rendering blood incoagulable in vivo which comprises administering to a mammal in need thereof from about 0.2 to about 10 mcg./kg. of the enzyme of claim 1.

5. A method according to claim 4 wherein the amount of the enzyme is from 2 to 10 mcg./kg.

References Cited

Reid, The Lancet, Mar. 23, 1963, pp. 621–626.
Reid, The Lancet, Sat. Mar. 9, 1968, pp. 485–486.
Ashford, The Lancet, Sat., Mar. 9, 1968, pp. 486–489.
Bell, The Lancet, Sat., Mar. 9, 1968, pp. 490–493.
Sharp, The Lancet, Sat., Mar. 9, 1968, pp. 493–499.
The Lancet, Sat., Mar. 9, 1968, p. 513.
Plagnol, Annales de L'Institut Pasteur, vol. 92, 1957, pp. 525–533.
Williams, Biochem. J., vol. 84, 1962, pp. 52–62.
Pfleiderer, Biochem. et Biophysica Acta, vol. 51, 1961, pp. 482–493.
Heftman, Chromatography, Reinhold Pub. Co., N.Y., 2nd ed. 1967, pp. xiii, xiv, xv, xvi, xix, xx.

ALBERT T. MEYERS, Primary Examiner

A. P. FAGELSON, Assistant Examiner

U.S. Cl. X.R.

195—62, 66 B; 424—98